United States Patent [19]

Lee

[11] 4,411,874

[45] Oct. 25, 1983

[54] DETOXIFICATION OF SPENT ANTIMONY HALIDE CATALYST AND RECOVERY OF ANTIMONY VALUES

[75] Inventor: Sung K. Lee, East Amherst, N.Y.

[73] Assignee: SCA Services, Inc., Boston, Mass.

[21] Appl. No.: 372,996

[22] Filed: Apr. 29, 1982

[51] Int. Cl.$^3$ .............................................. C01B 29/00
[52] U.S. Cl. ..................................... 423/87; 423/245; 423/497
[58] Field of Search .................... 423/245 R, 87, 491, 423/497

[56] References Cited

U.S. PATENT DOCUMENTS

| | | | |
|---|---|---|---|
| 1,441,696 | 1/1923 | McNeil et al. | 423/245 |
| 2,415,346 | 2/1947 | Farr | 423/491 |
| 3,054,653 | 9/1962 | Barton et al. | 423/245 R |
| 3,806,589 | 4/1974 | Becher et al. | 423/87 |
| 3,872,210 | 3/1975 | Ukaji et al. | 423/87 |
| 4,005,176 | 1/1977 | Fernschild et al. | 423/87 |
| 4,292,285 | 9/1981 | Nakao et al. | 423/245 |

*Primary Examiner*—Edward J. Meros
*Assistant Examiner*—Wayne A. Langel
*Attorney, Agent, or Firm*—Raymond F. Kramer

[57] ABSTRACT

A method for detoxification of spent catalyst from a fluorination process includes the step of hydrolyzing such spent catalyst in the presence of aqueous calcium chloride to produce insoluble compounds which are separable from the aqueous medium. The spent catalyst is one which includes at least one antimony halide, such as $SbCl_5$, $SbF_5$, $SbCl_3$ and/or $SbF_3$, usually with some halogenated hydrocarbons, such as partially chlorinated methane, partially chlorinated ethane and/or chlorofluorocarbons of 1 to 5 carbon atoms, often in the presence of arsenic compounds, such as $AsCl_3$, hydrofluoric acid, and antimony chlorofluoride, such as $SbCl_4F$. The spent catalyst may be directly treated with the aqueous calcium chloride solution, very preferably with such solution containing small amounts of a transition metal ion, such as $Fe^{++}$ or $Fe^{+++}$, or aluminum ion, e.g., $Al^{+++}$, after which volatile gases emitted are treated, an organic liquid phase is separated from an aqueous liquid phase containing dispersed precipitated insoluble compounds of antimony and arsenic (when arsenic is present), such as calcium salts of acids thereof, oxides, hydroxides and/or oxyhalides thereof resulting from the hydrolysis reaction, such insolubles are separated from the aqueous liquid medium, as by filtration, and the filtrate is neutralized with lime. The neutralized filtrate, containing calcium chloride resulting from the neutralization reaction, may be returned to the hydrolysis step and/or may be further treated by a sulfide or hydrosulfide and a water soluble iron salt, such as aqueous solutions of sodium sulfide or sodium hydrosulfide, and ferric chloride, to co-precipitate compounds of antimony and arsenic, which may be removed from the aqueous medium, together with precipitated compounds of heavy metals which may be present, after which the filtrate may be discharged to a sewer after suitable monitoring to ensure that the contents of toxic materials are within permissible ranges for such discharge. The antimony compounds removed during the process may be recovered and converted to useful form, as for reuse as fluorination catalysts, and other removed materials may also be recovered, regenerated and/or reused.

27 Claims, 3 Drawing Figures

DETOXIFICATION OF SPENT ANTIMONY HALIDE CATALYST AND RECOVERY OF ANTIMONY VALUES

This invention relates to the detoxification and recovery of spent catalysts. More particularly, it relates to a method for detoxifying spent antimony halide catalysts resulting from a process for fluorinating halogenated hydrocarbons, after which the catalytic material may be recovered.

By means of the invented process toxic materials, such as antimony and arsenic compounds, are readily removable from the spent catalysts and the antimony compounds are recoverable for conversion to catalyst and for re-use. Other materials present in the spent catalyst can be suitably separated and may be recovered for re-use, if desired. Liquid and gaseous effluents from the treatment process are dischargeable to the atmosphere and sewer, respectively, and meet health and environmental standards for such discharges.

Among the more complex problems confronting the chemical industry is the management of hazardous wastes from chemical processes. Industrial wastes are inevitable results of the operations of technologically advanced societies. In order to supply such societies with the abundances of goods and services that the people thereof demand to sustain their high standards of living large amounts of synthetic chemicals are required and during the manufacture of these compounds waste products will result. Vigorous efforts have been made by the chemical industries to minimize the production of wastes, as by modifying manufacturing methods, recycling materials and converting such "wastes" to usable products. Although much progress has been made, such efforts are continuing and must continue so that the amount of waste to be disposed of may be minimized, and so that the wastes will be insoluble.

Among the important synthetic organic chemicals required in the chemical, electronics and appliance industries, especially for the operation of refrigeration equipment and the manufacture of foamed plastics for insulation and other purposes, are the chlorofluorocarbons, especially the chlorofluoroalkanes of 1 to 5 carbon atoms, some of which are sold under the trademarks FREON and GENETRON. The chlorofluorocarbons are often made by catalytic processes which utilize antimony halides, such as $SbCl_5$. Antimony, as is known, is often contaminated with arsenic and therefore antimony halides may be accompanied by arsenic halide. Sometimes arsenic halide(s) may intentionally be components of the catalyst. After use, when catalytic efficiency of such a fluorination catalyst is reduced so as to make its further use uneconomic, it is removed from the reaction vessel and replaced by fresh catalyst. It then presents a disposal problem. Various methods have been tried in an effort to solve such problem effectively but it is considered that prior to the present invention none has been sufficiently satisfactory so as to be called successful. However, the method of this invention permits the ready separation and recovery of various toxic and non-toxic components of the spent antimony halide catalyst from the fluorination of halogenated hydrocarbons, allowing materials from the treatment process that are discharged into the atmosphere or the sewer to be within permissible health and environmental limits.

In accordance with the present invention a method for detoxifying spent antimony halide catalyst from a process for fluorinating halogenated hydrocarbons comprises hydrolyzing such spent catalyst in the presence of aqueous calcium chloride to produce an insoluble antimony compound in/with an aqueous liquid medium and separating such insoluble compound and other insoluble material which may be present from the aqueous liquid medium. Typically, the spent catalyst being treated comprises $SbCl_5$, $SbF_5$, $SbCl_4F$, $SbCl_3$, $SbF_3$, $AsCl_3$, HF, partially chlorinated methane and ethane, and chlorofluorocarbons of 1 to 5 carbon atoms, preferably the hydrolysis of the spent catalyst is with aqueous calcium chloride in which the proportion of calcium chloride, on an anhydrous basis, is about 20 to 100%, preferably 60 to 90% by weight of that of the spent catalyst material, during and after hydrolysis any gases produced are treated and resulting aqueous and organic phases are separated, the acidity of the aqueous phase is neutralized with lime, preferably after removal of any precipitated solids from the aqueous medium, as by filtration, any remaining antimony and arsenic in the neutralized medium are co-precipitated by treatment with sulfide or hydrosulfide and water soluble iron salt, and the resulting liquid, from which the co-precipitate has been removed, is discharged to the sewer, after monitoring to ensure that it meets discharge requirements. Alternatively, and often preferably, after neutralization and filtration the liquid phase, which is a calcium chloride solution, may be returned to the hydrolysis reaction, as a source of calcium chloride. Although batch processes are operative, for high capacity treatments of large quantities of spent catalysts continuous operation is preferred.

The lime neutralization mentioned above is carried out in such a manner as to utilize the heat of neutralization to help to remove trace quantities of organic materials adsorbed onto the precipitates. The volatile organics driven off by the heat of neutralization are condensed and the non-condensables are scrubbed out and adsorbed onto activated carbon granules in canisters through which they are passed, to control organic odors. Odor removal from the neutralized material may also be accomplished by purging it with a stream of air or steam.

The separated organic phase mentioned in the above process description often includes "rag" or interface layers. The organic layer, with the rag layer, may be subjected to treatment with anhydrous calcium chloride solid particles to dry out any moisture present with the organic material thereof and thereby produce clear neutral organic layers. This treatment obviates the washing and distillation of the organic material containing the rag materials.

The invention will be readily understood from the present specification, considered in conjunction with the accompanying drawing, in which.

Figure 1:
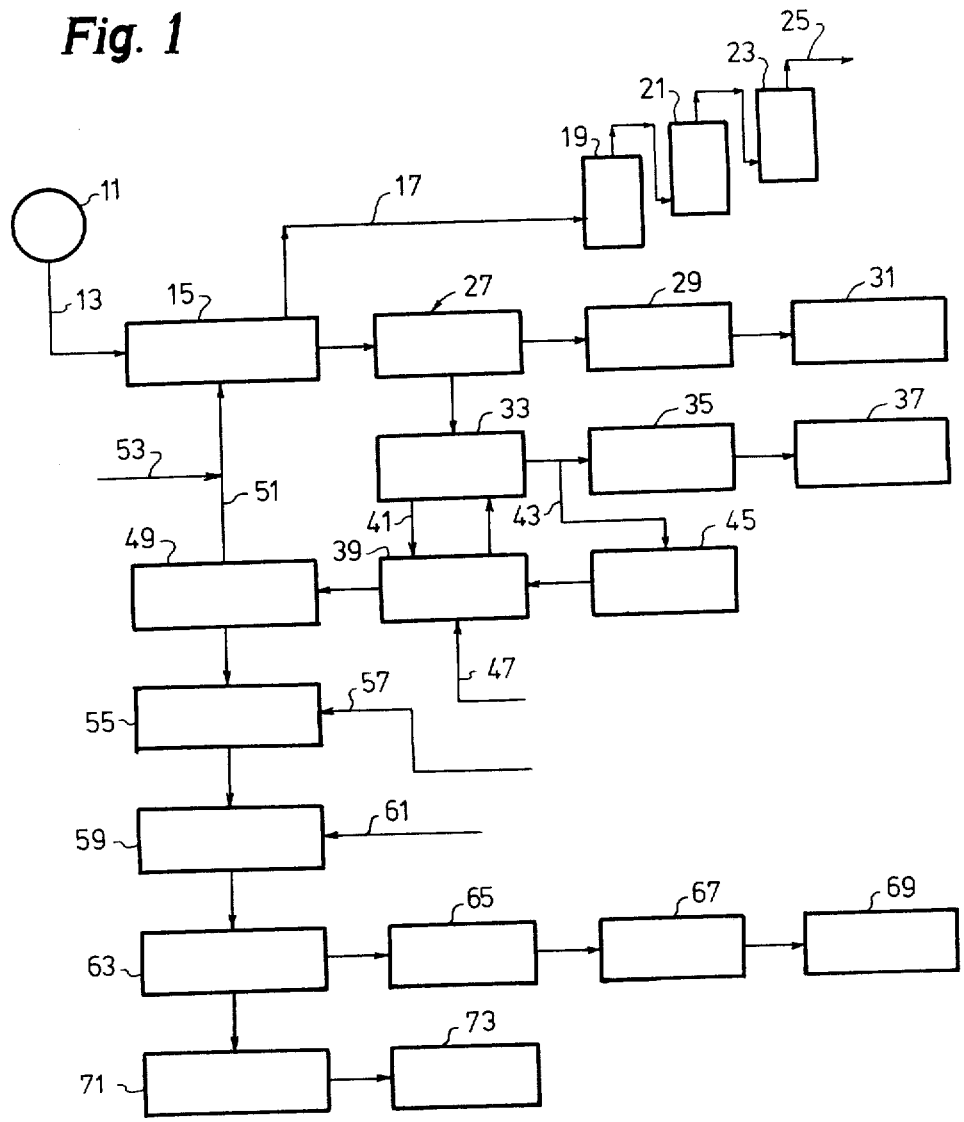
FIG. 1 is a flow diagram of a typical batch-type process of this invention.

Although the prior art discloses processes for the manufacture of fluorochlorinated hydrocarbons wherein antimony halides are employed as catalysts, and recognizes the disposal and/or recovery problems associated with spent catalysts, it does not disclose or suggest the present invention. Chemical treatment of spent catalyst waste materials, with the separation of antimony and arsenic from other spent catalyst materials by hydrolysis, using lime or other alkali for direct treatment of the spent catalyst, is described, as are the conversion of antimony and arsenic to sulfides and other precipitatable compounds by treatment with sodium sulfide or other soluble sulfide and water soluble iron salt. However, the art neither discloses nor suggests direct treatment of the spent catalyst with aqueous calcium chloride solution, separation of the aqueous and organic phases, removal from the aqueous phase of solid material resulting from the reactions, and neutralization of the aqueous medium, which may be returned to the hydrolysis reaction as calcium chloride. Nor does the art suggest a process like the present one wherein the gaseous and liquid effluents satisfactorily meet severe discharge standards without excessive processing and treatment.

A search conducted in subclasses 210-150; -711; -712; -713; -753; and 423-87 resulted in the finding of U.S. Pat. Nos. 1,406,597; 2,786,738; 3,760,059; 3,806,589; 3,872,210; and 4,118,243. Also relevant are U.S. Pat. Nos. 2,005,705; 2,005,708-2,005,711; and 2,005,713, which relate to the manufacture of fluorinated hydrocarbons by a catalytic reaction employing antimony halide as the catalyst. U.S. Pat. No. 1,406,597 teaches the recovery of arsenic from ores by treatment with ferric chloride, chlorine and sulfide and mentions the presence of calcium carbonate with the arsenic and the production of calcium chloride from the carbonate during the treatment. U.S. Pat. No. 3,806,589 relates to the regeneration of antimony halide catalysts as antimony oxychloride and in U.S. Pat. No. 3,872,210 treatment of a spent antimony halide catalyst with iron or a source of S= is disclosed. U.S. Pat. No. 4,118,243 teaches the treatment of arsenic-containing waste materials with sulfuric acid and calcium hydroxide. The other patents are considered to be merely cumulative and do not warrant discussion.

The spent catalytic waste to which the processes of the present invention are applied is that resulting from manufacture of chlorofluorocarbons such as trichlorofluoromethane (Freon 11), dichlorodifluoromethane (Freon 12), dichloromonofluoromethane (Freon 21), monochlorodifluoromethane (Freon 22), trichlorotrifluoroethane (Freon 113), dichlorotetrafluoroethane (Freon 114), and monochloropentafluoroethane (Freon 115). Such compounds and other chlorofluorocarbons, especially those of 1 to 5 carbon atoms which are aliphatic or alicyclic and are saturated or contain a single double bond, may be made by the fluorination of suitable lower chloroalkanes and chloroalkenes, such as carbon tetrachloride, chloroform, tetrachloroethane, hexachloroethane and tetrachloroethylene, by catalytic fluorination processes utilizing suitable halide catalysts, such as chlorides or chlorofluorides of antimony, often with similar compounds of arsenic being present. Such processes are often conducted with hydrofluoric acid being employed as the fluorinating agent. Some methods for such reactions are described in U.S. Pat. Nos. 2,005,705, 2,005,708-2,005,711, 2,005,713 and 2,350,638, for example. Normally, a preferred catalyst for such processes is antimony pentachloride, which may be accompanied by arsenic pentachloride. Reduced forms of such compounds, the corresponding trichlorides, also may be present during the fluorination reaction. Because various fluorination reactions of these types are well known and because the reactions per se are not parts of the present invention except insofar as they produce the spent catalyst problem that is to be solved, no further description of the processes is considered to be warranted and reference should be made to the mentioned patents and allied literature for further information about them.

When the rate of production of the desired chlorofluorocarbon is decreased below that which is acceptable for commercial operation, which happens because of inactivation of the catalyst, the spent catalyst will be replaced by new or regenerated catalytic material and the spent catalyst will then be regenerated or made suitable for disposal. Typically, the spent catalyst will include some or all of antimony pentachloride, antimony trichloride, antimony trifluoride, antimony chlorofluoride, antimony pentoxide, antimony pentafluoride, antimony tetrafluoromonochloride, corresponding compounds of arsenic when arsenic is present in the catalyst, corresponding bromides and mixed chlorides and bromides, if a bromide catalyst is employed, HF, hydrogen chloride, hydrogen bromide (when a bromide catalyst is used), phosgene, carbonyl fluoride, heavy metal chlorides (wherein the heavy metals are typically chromium, nickel, copper and iron), silicon halide, silicon dioxide and various halogenated (but usually not iodinated) organic compounds, including but not limited to those intended to be manufactured in the catalytic process. The spent catalyst resulting, when removed from the reaction and before treatment, is highly reactive with either air or water and is capable of producing very hazardous conditions [especially when it contains arsenic compound(s)] when so exposed, unless the exposure is made under closed system conditions, like those of the present invention, when the catalyst is brought into contact with aqueous calcium chloride.

Although the different compounds of the spent catalysts are not limited to those mentioned in the preceding paragraph often the more significant of the catalyst components will be $SbCl_5$, $SbCl_4F$, $SbCl_3$, $AsCl_3$, HF, partially chlorinated methane, partially chlorinated ethane, and chlorofluorocarbons of 1 to 5 carbon atoms (including both chlorofluoroalkanes and chlorofluoromonoalkenes). The total content of halides of antimony and arsenic present in such spent catalyst will normally be within the range of 30 to 90%, with narrower ranges being 40 to 80% and 55 to 70%. The proportion of halide or total halides of antimony to halide or total halides of arsenic will normally be within the range of 3:1 to 20:1, with narrower ranges being 4:1 to 15:1 and 5:1 to 10:1. The total of halogenated hydrocarbons will usually be from 5 to 60%, with narrower ranges of such content being 10 to 50% and 20 to 40%. Of the halogenated hydrocarbons normally from 1/5 to ½ will be lower chlorofluorocarbons, with the balance being lower chlorocarbons. Hydrogen fluoride will often constitute from 3 to 15% of the spent catalyst, with narrower ranges thereof being from 4 to 10% and 4 to 8%. Heavy metal halides, although often in the spent catalyst, are usually present in only traces or small quantities. Of course, others of the previously mentioned materials may also be present in particular spent catalysts but normally the proportions thereof will be less than 5% of the total spent catalyst and in most cases, less than 1% thereof.

Typically, the spent catalyst being treated by the method of this invention is a dark brown fuming liquid of low viscosity and with a pungent chlorinated hydrocarbon odor. A typical such catalyst comprises about 50% of a mixture of $SbCl_5$ and $SbCl_4F$, 7% of $SbCl_3$, 7% of $AsCl_3$, 15% of symmetrical tetrachloroethane, 5% of chloroform, 10% of $C_2$-$C_5$ chlorofluorocarbons, 6% of HF and trace quantities of chromium, nickel and copper chlorides and/or other halides of such metals, but sometimes the mixture of $SbCl_5$ and $SbCl_4F$ may be 70% or between 50 and 70%, with the proportions of other components being modified or adjusted accordingly (being reduced). An analysis of the liquid and solid portions of a similar spent catalyst shows 72.4% of a mixture of antimony chloride, 3.8% of a mixture of arsenic chlorides, 10.4% of sym-tetrachloroethane, 4.1% of chloroform, 1.3% of methylene chloride, 2.9% of Freon 22 and 0.2% of Freon 21, with the balance being other organic compounds. Volatile gases that are emitted from the spent catalyst include silicon tetrachloride and silicon tetrafluoride, Freon 22, phosgene, carbonyl fluoride and methylene chloride. The presences of such compounds and percentages thereof in the gases emitted by such a spent catalyst sample have been determined by gas chromatography and mass spectrometry.

It is considered that a detailed description of the invention is best given in conjunction with the accompanying drawing, which enables the viewer to appreciate better the effectiveness and practicability of the process.

Referring to FIG. 1, numeral 11 designates a container for the spent catalytic waste, which container is desirably sealed so as to prevent escape of volatile gaseous materials, or alternatively is satisfactorily maintainable at a low enough temperature to diminish the volatility of such chemicals. The vessel 11 may also be vented through scrubbing means and/or other means for preventing the escape of toxic materials with any vented gases. The spent catalyst from a fluorination reaction is fed through line 13 to hydrolysis vessel or reacting means 15 wherein it is reacted, preferably at about ambient temperature, with aqueous calcium chloride solution, which reaction generates heat, usually causing the vaporization of some volatile liquid components of the waste and promoting separation from the catalyst of some dissolved gases thereof. Hydrolysis vessel 15 is preferably equipped with cooling and/or heating means for suitable temperature regulation. Heat from the heating means and from the heat of the reactions may be used to promote the removal of any trace organics during the hydrolysis. Any volatile gases produced during the reaction are vented through line 17 to a scrubber 19, wherein they are preferably reacted with a caustic material, such as sodium hydroxide. Then they are sequentially passed through a cold trap 21, wherein condensables are liquefied and through an organic absorbing means 23, usually a column or bed of activated carbon, wherein toxic and other organic materials not previously removed are absorbed, following which the purified gases, of toxic materials contents at safe levels for venting, are discharged to the atmosphere, preferably after monitoring to assure that the effluent meets required standards.

In the previous description it will be noted that lines between the scrubber and the cold trap and between the cold trap and the absorber were not numerically designated, and it is clear that flow promoting means, such as pumps, and flow control means, such as valves and meters, were not mentioned. For simplicity of presentation such will also be omitted from the drawing (but connecting lines or piping will be illustrated) and from much of the following description, although it will be realized that pumps, blowers, mixers, heat exchangers, valves, meters, gauges, etc., will be employed in manners known to those of skill in the art for carrying out the invented process. With respect to the pipelines or other means for transporting treatment chemicals and materials being processed it is considered that the drawing is sufficient to describe these, and it is noted that flow directions in the piping are indicated by arrows in the present flow sheet drawing.

After the hydrolysis and any other accompanying reactions with the spent catalyst that may take place in means 15 the hydrolyzed product is delivered to a phase separation vessel or other separation means 27 wherein resulting organic and aqueous layers are separated. Such separation can take place in the vessel 15 but for speed and efficiency of processing it is preferred that a specific separation vessel be used. When the hydrolysis and phase separation are conducted in the same vessel the hydrolyzed material will usually be allowed to stand and separate, with the aqueous layer being at the top and the organic layer being at the bottom, so that the organic material can be drained from the vessel bottom. A "rag" or interface layer may sometimes be present between the other layers. Often phase separation will be effected by draining or decantation but in some instances centrifuging or similar operations can be employed. As was previously indicated, the organic material, including halogenated hydrocarbons, such as chlorinated and chlorofluorinated hydrocarbons, together with other organics that may be present, will normally settle to a lower layer, which is removed from means 27 (or vessel 15) and is pumped or otherwise delivered to vessel 29, from whence it may be transported to a recovery vessel 31 for further processing, to be recycled in many cases, to the fluorination reaction, from whence the spent catalytic waste came. The aqueous layer, usually the upper layer, then has any solid material therein, usually including some finely divided precipitate, produced in the hydrolysis step, sent to further separation means 33, which is preferably a filter or a series of filters (but a centrifuge may be substituted), from which solids are removed, which are sent to an intermediate holding vessel 35 and ultimately to recovery or recycling, designated by numeral 37. Sometimes there will be a separate layer, high in content of insolubles, located between the aqueous and organic layers. This "rag layer" is considered to be a part of the aqueous layer but it is within the invention to remove it with the organic layer and treat it with anhydrous calcium chloride to produce separate aqueous and organic phases from it, regenerating clean organics free from any moisture and solids. Of course, the aqueous material separated may be treated as previously described or may be combined with the aqueous upper layer previously mentioned, and then so treated.

Removed solids may include insoluble compounds of antimony and arsenic, such as have previously been mentioned, and may also include substantial proportions of calcium fluoride, depending on the content of any hydrogen fluoride that may have been present in the spent catalyst charged. The antimony and arsenic compounds may be reconverted to suitable form for employment as reaction catalysts and may be returned to the fluorination reaction. Alternatively, they may be converted to other useful chemicals or may be dried and disposed of by acceptable means. Despite the fact that the arsenic may be difficult to separate from antimony by cost-efficient methods this is not a detriment to reuse of the catalyst because the proportion of arsenic to antimony is not increased over that in the original catalyst. Thus, the antimony halide catalyst may be regenerated repeatedly without increasing the content therein of the toxic arsenic compound. The calcium chloride solution may also be recovered for reuse in the process.

As illustrated in the drawing, a portion of the filtrate, instead being passed directly to a neutralization vessel or means 39 through line 41 may be taken off the solids materials being sent to intermediate holding vessel 35, possibly after pressing or compacting of such solids, and sent through line 43 to an intermediate holding vessel 45 from whence it too may be fed to neutralization vessel 39.

The filtrate in vessel 39 is neutralized by the addition of lime thereto, through line 47. The lime addition is preferably as an aqueous suspension but it is within the invention to employ the lime in powder form too. Similarly, while slaked lime or hydrated lime (calcium hydroxide) is the compound preferred, it is within the invention to employ some calcium oxide too, and the hydration of and neutralization by such product result in generations of heat. It is within this invention to carry out elevated temperature neutralization, e.g., at a temperature in the range of 40° to 90° C., to accomplish neutralization and separation of trace organics simultaneously, but neutralizations at lower temperatures, e.g., room temperature, are also feasible. During the lime neutralization the remainders of the antimony and arsenic will be precipitated out as insoluble salts of the corresponding hydroxides and hydrated oxides, as both trivalent and pentavalent complexes. The neutralized filtrate is returned to the filtering operation through line 47, any solids are filtered out, and the calcium chloride brine is regenerated for the hydrolysis step.

After neutralization the filtrate may be pumped to vessel 49 (or other suitable means, which sometimes can be a pipe fitting), from which it may be sent for additional treatment to remove traces of antimony and arsenic, and other components, by further chemical reaction, or from which it may be recycled back to the hydrolysis vessel 15. Alternatively, separate parts of the neutralized filtration medium may be further reacted with chemicals for arsenic and antimony removal and/or may be returned to the hydrolysis vessel. Means may be provided to permit control of the proportion of the neutralized filtrate being sent along either or both of such routes.

When the neutralized filtrate is returned to the hydrolysis step it passes through line 51 and during such flow make-up calcium chloride, preferably as a solution, will be added to the stream through line 53, if it is needed. When neutralized filtrate is to be subjected to further chemical reactions to remove toxic material it is pumped to dropped to a reactor 55, to which a source of sulfide ions, such as aqueous sodium sulfide or hydrosulfide solution, is added through line 57, causing precipitation of sulfides of arsenic and antimony. The resulting aqueous medium, usually containing the precipitated and dispersed solids from the sulfide reaction, is pH adjusted to near neutrality, e.g., a pH of 6 to 8, and may then be sent to a subsequent reaction vessel 59 to which a ferric chloride solution is added through line 61, causing co-precipitation of insoluble compounds of arsenic, antimony, iron and other heavy metal(s) that may be present, together with sulfur. Instead of utilizing separate reaction vessels 55 and 59, the sulfide and iron salt solution feeds may be directed to the same reaction vessel (and elsewhere in this process similar economies may be made, as will be apparent to those of skill in the art). The aqueous medium containing the coprecipitated solid materials may then be filtered at 63 with filtrate 65 being monitored at 67 and, if the monitoring shows it to be safe, may be sent to the plant outlet for treated waste 69. If unsatisfactory, the filtrate may be recycled back so that it is additionally reacted with sulfide and iron salt. The solids 71 from filtration may be subjected to a recovery operation 73 or, when that is not economically feasible, may be packaged in suitable containers and disposed of at an approved secured chemical landfill facility.

Figure 2:
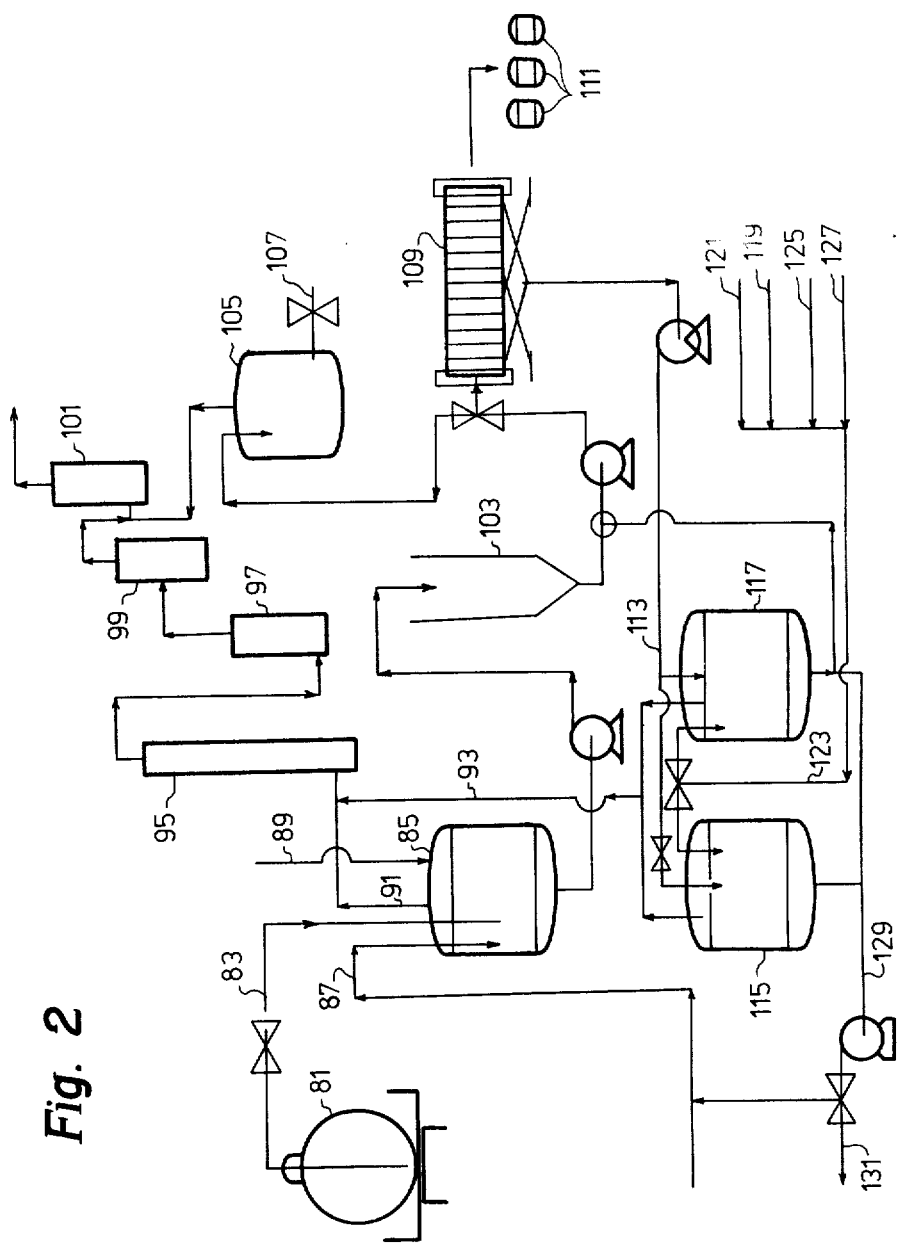
FIG. 2 is a flow diagram of a preferred continuous process of this invention.

Basically, FIG. 2 is a process flow sheet drawing corresponding generally to FIG. 1, with some modifications, and showing particular types of equipment employed. As illustrated in FIG. 2, from tank car 81 spent catalyst is delivered to a glass-lined reaction vessel 85, aqueous calcium chloride solution from the process is returned to such reaction vessel through line 87 and any make-up calcium chloride solution or water is added through line 89. Any gases emitted from vessel 85 and any gases emitted from other reaction vessels (which may be of the Ronex type) are passed through lines 91 and 93, respectively, to scrubber 95 and then sequentially to a secondary scrubber 97, a primary activated carbon column 99 and a secondary activated carbon column 101, from which the purified gaseous effluent may be discharged to the atmosphere, preferably after having been monitored and having been found to meet applicable discharge standards.

After completion of the hydrolysis reaction the mix, including both organic and inorganic or aqueous phases, is pumped to separation vessel 103, from which the lower layer is pumped to tank 105, which is vented to the secondary activated carbon adsorber 101. The organic materials may then be sent via line 107 for recovery, further processing and/or return to the fluorination reaction. After removal of the lower layer the upper aqueous layer from separating or decanting means 103, which upper layer contains precipitated and dispersed solid material, may be pumped to plate-and-frame filter press 109 or to a vacuum filter, and the solids that are removed by such filtration are recovered, being sent to regeneration processes, or drummed and sent to a chemical landfill or other suitable approved landfill, as represented by drums 111. Alternatively, and often preferably, once the organic layer is removed the neutralization may be carried out without intermediate filtration. Then, instead of using filter 109 the upper phase material is pumped through a line like 113 to either or both of Ronex-type reaction vessels 115 and 117, which may often be employed alternately. Both vessels are vented via line 93 to the scrubbers and carbon adsorbers previously described. The neutralized product may then be filtered, thereby saving a filtration operation.

Hydrolyzed aqueous layer, alternately in each of vessels 115 and 117, is neutralized with lime, which is added to line 119 with or without additional water from line 121, through line 123. Water may be added through line 121 to adjust the concentration of the lime. The neutralized material is then filtered. The resulting mixtures of particulate materials and aqueous liquid or the aqueous liquid only may then be pumped through lines 129 and 87 back to the hydrolysis reaction. Instead of recycling in the manner described the neutralization of the filtrate from filter press 109 by lime may be carried out in one of vessels 115 and 117 and the product thereof may be recycled directly to the hydrolysis step after filtration and removal of solids or a portion of the filtrate may be further reacted with sulfide and iron salt and sent back to filter 109, with the resulting filtrate being passed back through one of mixers 115 and 117 and through line 129 to a discharge line 131, from which it may be pumped to a monitored plant outlet for treated waste.

Figure 3:
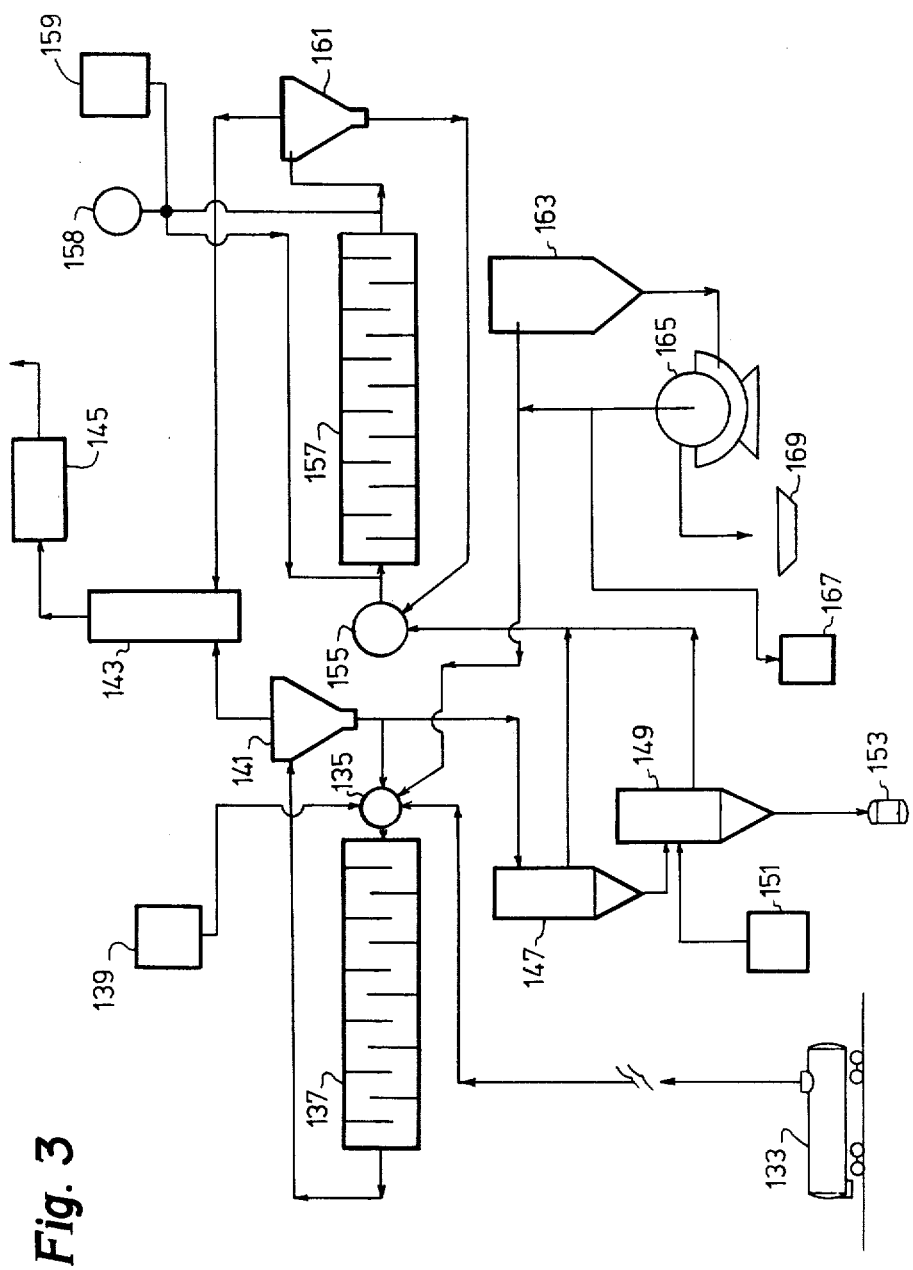
FIG. 3 is a schematic illustration of a continuous reaction process essentially the same as the batch-type process, utilizing continuous in-line reactors for hydrolysis and neutralization.

Referring to FIG. 3, which illustrates another continuous process, spent catalyst is fed from tank car or other source 133 through combination valve 135 to static mixer 137, where it is mixed with a calcium chloride solution fed from tank 139. Positive displacement pumps and metering devices are employed to maintain desired ratios of the spent catalyst and the calcium chloride solution in the mixer, and check valves are used to prevent back flows.

The hydrolyzed reaction product from mixer 137 is passed through a cyclone type degassing chamber 141 and the gases and volatile organics are scrubbed and treated, respectively, in scrubber 143 and in carbon adsorber 145 in a manner like that described with respect to the apparatus of FIG. 2. Some of the degassed stream is returned to mixer 137 through valve 135 and the rest is pumped to separators or decanters 147 and 149, as shown, with decanter 149 also serving as a dryer, due to the addition of anhydrous calcium chloride to it from supply 151. Organics are removed from decanter 149 and are drummed, as represented by numeral 153, for recovery or for disposal.

The aqueous material from separators 147 and 149 is pumped through a combinator 155 and a continuous in-line neutralizing mixer 157 and lime slurry is added to the neutralizer from supply tank 159. The slurry is kept in motion in tank 159 to prevent settling. The addition of the lime slurry to the neutralizer is controlled by automatic pH monitors, which are represented by numeral 158.

The neutralized slurry from neutralizer 157 is pumped to degassing chamber 161 and the volatiles are sent to scrubber 143 and adsorber 145, with the degassed material being sent to filtration feed tank 163 and thence to filter 165. A portion of the degassed material from chamber 161 may be recycled through combinator 155 and through neutralizer 157, as is shown.

The spent catalyst that is treated may be that from a particular fluorination reaction or may be a mixture of catalysts removed from a number of different types of fluorination reactions for the production of chlorofluorinated lower hydrocarbons (or bromofluorinated counterparts). Thus, while most of the catalytic materials are primarily chloride(s) of antimony, with corresponding arsenic impurity compounds present, sometimes the catalysts will be bromides, fluorides, chlorofluorides, bromofluorides or chlorobromides. The catalytic medium is normally highly acidic and consequently highly toxic gaseous materials may be present or may be produced, such as stibine and arsine, in addition to the highly toxic and fuming liquid and solid halides of antimony and arsenic, HF and hydrochloric acid. The components of such spent catalysts are difficult to separate by conventional means due to mutual solubilities, toxicities, reactivities, etc. Separations are more difficult and more dangerous when other hydrolyzing agents, such as lime, are employed for direct treatment of the catalytic waste. In the present hydrolysis reaction the spent antimony and arsenic halides catalyst, and other reactive functional materials present, such as hydrofluoric acid and any silicon tetrachloride, silicon tetrafluoride and silicon tetrabromide, are hydrolyzed or otherwise reacted in the presence of aqueous calcium chloride solution to produce acid soluble and insoluble antimony and arsenic compounds as calcium salts of acids of antimony and arsenic, antimony and arsenic complexes, and as calcium fluoride. The effect of the direct treating with aqueous calcium chloride solution is to create separate aqueous and organic phases, of which the organic phase is usually the heavier, so that the organics collect below the aqueous phase, with the various salts and insoluble compounds, such as oxides, oxyhalides, hydroxides, etc., being dispersed in the aqueous phase, and sometimes also being present as a separate band or rag between the liquid phases.

The employment of aqueous calcium chloride solution as the hydrolysis medium, very preferably with such solution containing small quantities of compound(s) of iron and/or other transition elements and/or aluminum, is important to the present invention because it results in a better direct separation of the solid hydrolysis products with the aqueous calcium chloride solution from the organic materials, and results in better precipitation out of the antimony and arsenic present, and of other impurities. The presence of the iron and/or other transition element(s) and/or aluminum ion(s) surprisingly appears to contribute to this good phase separation. Such improved separation is also considered to be due, at least in part, to the lower pH of the medium and the avoidance of more elevated temperatures such as might have been produced by the heat of neutralization of the acidic spent catalyst by the calcium hydroxide (or calcium oxide). In the presence of significantly large quantities of halogenated organic compounds, creation of alkaline conditions at elevated temperatures promotes the production of dehydrohalogenated byproducts, which are often hazardous. Furthermore, the calcium chloride solution is considered to be generally less of a solvent for the various insoluble arsenic and antimony compounds and for the chlorofluorocarbons, permitting better separations of aqueous and organic phases, which improved separations are also aided by the lower temperatures of such liquid phases in the hydrolysis vessel (and in the decanting vessel). Such good separations at ambient temperatures of the hydrophilic and lipophilic phases allows the avoidance of costly steam distillation to remove organic materials from the aqueous phase. Spent catalyst of the present type contains significant quantities of hydrogen fluoride or fluoride ions. Using calcium chloride for treating the catalyst results in quick conversion of HF or F$^-$ to insoluble calcium fluoride but because lime is less soluble than calcium chloride such instantaneous conversion is not obtained with it. It also appears that the antimony and arsenic compounds and complexes are hydrolyzed more completely at lower pH's, at which they apparently pass through the forms of oxyhalide (usually oxychloride) intermediates. Such hydrolysis also appears to be aided by the presence of the iron and/or other transition element(s) and/or aluminum ions when they are present. At higher ph's and elevated temperatures, even slightly elevated temperatures, tetrachloroethane may undergo dehydrochlorination to produce dichloroacetylene, which is potentially explosive. Employment of aqueous calcium chloride as the hydrolysis medium prevents the production of such explosive compound. Thus, the hydrolysis process utilizing aqueous calcium chloride is safe, produces greater design and engineering flexibility, and permits the use of a wide variety of different unit operations, including the employment of continuous tubular reactor systems for hydrolysis and chemical reactions. The resulting increased efficiency and safety obtainable are important advantages of the invention. A further highly desirable effect of the employment of the present hydrolysis medium is that, as has been indicated in the descriptions of the flow diagrams, the calcium chloride can be regenerated by lime treatment of the hydrocloric acid resulting from hydrolysis of the chlorides of antimony and arsenic present in the spent catalyst and at the same time fluorides present may be precipitated out and removed. The aqueous medium in which the chlorides are dissolved will often contain their limits of solubility of antimony and arsenic compounds, and accordingly will not dissolve more of such compounds and organic materials (due to salting out effects), leading to better removals thereof from the spent catalyst by hydrolysis and by subsequent reactions with sulfide and iron, and any other precipitating chemicals that may be employed.

The concentration of calcium chloride in the hydrolyzing medium may be chosen for greatest processing advantages. Thus, from 5 to 75 parts by weight of calcium chloride may be present per hundred parts by weight of water. Normally the calcium chloride concentration will be from 10 to 65%, considering only the calcium chloride and water present, and preferably will be in the range of 20 to 60%, e.g., 30 to 50%. The concentration of iron and/or other transition elements, such as chromium, nickel, copper, manganese, cobalt, titanium, molybdenum and silver, as soluble salts, preferably the chlorides, when soluble, and/or aluminum ions is in the range of a trace to 10%, preferably 0.01 to 3%, e.g., 0.05 to 0.5%. The presence of suitable such ions in the aqueous calcium chloride solution inhibits formation of organic rag phases, promotes complete reacting of $AsF_3$, $SbF_3$ and $SbF_5$ and promotes better phase separations. Although satisfactory precipitation may be obtainable over a range of temperatures above and below ambient temperature, such as from 10° to 60° C., normally such temperature range will be from 15° to 45° C., more preferably from 20° to 35° C. The proportion of calcium chloride used, as charged to the hydrolysis reaction, including any recycled calcium chloride and make-up feed thereof, on an anhydrous basis, with respect to the spent catalyst, will normally be within the range of about 20 to 100 or 200% by weight, preferably 40 to 100%, and more preferably 60 to 90%. On the basis of the halides of antimony and arsenic that are present, which are primarily the chlorides thereof in the usual situation, the proportion of calcium chloride, on an anhydrous basis, will normally be within the range of 35 to 200 or 350%, preferably 50 to 200% and more preferably 80 to 200%.

Treatment of the volatile gases from the hydrolysis with sodium hydroxide is intended to remove any volatile antimony and arsenic compounds, reactive carbonyl chlorides and fluorides, and acids. Solvent materials may be recovered from the scrubber liquid. The activated carbon columns may be regenerated by conventional treatments and, if desired, the adsorbed materials may be recovered therefrom.

In the neutralization of the separated and filtered aqueous medium from the hydrolysis step the filtrate pH is adjusted to be within the range of 3 to 14 by the addition of lime thereto, with such range preferably being from 7 to 12. Such neutralization reaction further precipitates out acid soluble antimony and arsenic compounds and regenerates the calcium chloride for recycling to the hydrolysis reaction or for subsequent sulfide and iron salt reactions to remove any traces of antimony and arsenic that could still be dissolved therein. The neutralization is accompanied by a high temperature rise due to the heat of hydration of the lime and the heat of neutralization of the acids present, with the resulting temperature usually being within the range of 40° to 100° C. When the filtrate is to be discharged to a plant outlet for treated waste any antimony and arsenic still remaining dissolved therein will be removed by either or both of sulfide and iron treatments (or equivalent methods). Before such treatments it will be desirable for the pH of the liquid to be above 7, e.g., 7.5 to 9, at which pH small amounts of sulfide, such as sodium sulfide, sodium hydrosulfide, ammonium sulfide or potassium sulfide, in aqueous solution, will be added, after which the pH will be adjusted to neutral or slightly lower, e.g., 5.6 to 7 (although pH's as low as 4 and even 2 are also operative) by the addition of aqueous ferric chloride solution, preferably at about 15% concentration, to precipitate or coprecipitate out any arsenic and antimony present as insoluble pyrite complexes. Almost all of the arsenic and antimony values present are thereby converted to insoluble arsenic and antimony compounds (especially in the preferred pH range) and some additional arsenic and antimony values are sorbed into such materials as iron coprecipitates. Alternatively, ferric chloride may be added to the filtrate to lower the pH to 7 to 8 to coprecipitate out $AsFe(OH)_2$ and $SbFe(OH)_2$. When the insoluble materials are filtered off or otherwise removed the water or liquid medium remaining will desirably have a concentration of less than about 0.01 p.p.m. of each of arsenic and antimony and can be discharged into the plant outlet for treated waste. The proportion of sulfide employed will normally be from 2 to 10 times, preferably about 4 to 6 times the theoretical value, prior to the addition of the iron halide solution, that will react with the arsenic and antimony values in the aqueous layer.

The following examples illustrate the invention but are not considered to be limiting thereof. Unless otherwise indicated, all parts in the examples and elsewhere in this specification are by weight, and all temperatures are in °C.

EXAMPLE 1

Utilizing suitable equipment, such as has been described in this specification and is illustrated in the drawing figures, 103.2 parts of spent catalyst of an analysis like that previously described in the specification as typical are mixed with 600 parts of an aqueous calcium chloride solution (made by dissolving 100 parts of calcium chloride dihydrate in 500 parts of city water). The mixing is in a reaction vessel suitable for hydrolysis of the spent catalyst, which is equipped with a mechanical stirrer, a thermometer, a condenser, a cooling water jacket and pressure equalized inlet means for the addition of materials to be reacted. The calcium chloride solution was first made in the same vessel. The catalyst was slowly transferred from the addition means to the calcium chloride solution in the reaction vessel below the surface of the solution, over a period of nine minutes. The catalyst had been transferred to the addition means from a pressurized tank and the closed system had been kept under a nitrogen atmosphere. During the admixing with the hydrolyzing solution the temperature rose to 32° C. The pressure was held at about atmospheric by having the gas space above the liquid level in the reactor communicating sequentially with a scrubber containing sodium hydroxide, a cold trap and activated carbon, and thence to the atmosphere. After completion of the admixing the reaction mixture was stirred for an additional ten minutes (normally addition times are over a period of 1 to 30 minutes, preferably 3 to 15 minutes, e.g., 5 to 10 minutes, and additional mixing thereafter takes from 1 minute to an hour, preferably 5 to 20 minutes, e.g., 8 to 15 minutes, for the present types of hydrolysis reactions), after which the entire contents were then transferred to a separating vessel, from which about 34 parts of lower organic layer (density of about 1.5 to 2 g./ml.) were separated. The organic layer was washed once with 50 parts of a 10% calcium chloride solution (but this step may be omitted) and the washing solution was combined with the aqueous upper layer from the reaction. The upper layer, with the suspended insoluble precipitated solid therein (including any solids in a more concentrated intermediate layer, although sometimes such intermediate layer will be filtered separately) was filtered to remove insoluble antimony and arsenic compounds, such as calcium salts and complexes. The filtrate was "neutralized" to a pH of 5 by the addition thereto of 56.5 parts of a commercial grade of hydrated lime. The neutralized batch was then filtered to remove antimony and arsenic salts of calcium. Subsequently there was added to the filtrate 1.1 part of a 10% aqueous sodium sulfide solution, followed by addition of 2.3 to 3.5 parts of a 25% aqueous ferric chloride solution to the filtrate-sulfide mixture. The pH of the treated neutralized filtrate was adjusted to about 7 and solids therein were filtered off, yielding a clear calcium chloride solution essentially free of arsenic and antimony (contents below 0.1 p.p.m. of each in some experiments).

As a result of the foregoing processing of the spent catalyst (hydrolysis and neutralization) there were obtained 198.3 parts of primary filter cake (from filtering of the aqueous layer after the hydrolysis reaction and the neutralization by lime), 8.8 parts of secondary filter cake (from filtering of the sulfide-iron treated neutralized materials), 46 parts of organic materials, separated from the aqueous layer after hydrolysis, a small proportion, less than 5 parts, of volatile components (not present with the liquid organic materials) and 501 parts of process medium (water plus calcium chloride and any other dissolved salts). The combined filter cake material contained 36.3% of antimony and 1.3% of arsenic. The organic material contained 15 p.p.m. antimony and 10 p.p.m. arsenic while the process solution, either for discharge or recycling, contained 2 p.p.m. antimony and 1 p.p.m. arsenic, which, in other such experiments with improved control of reaction conditions, may be lowered to less than 0.1 p.p.m. of each of antimony and arsenic. The volatile materials, as recovered from the scrubber liquid and analyzed, included 15 p.p.m. of antimony and 166 p.p.m. of arsenic, together with monochlorodifluoromethane.

The organic fraction analyzed about 57.4% of sym-tetrachloroethane, 16.1% of chloroform, 7.6% of methylene chloride, and proportions less than 1% each of 1,1,2,2-tetrachloro-1,2-difluoroethane; hexachloroethane; 1,1,2-trichloro-2,2-difluoroethane; 1,1-difluoro-1,2-dichloro-2-bromoethane; pentachlorofluoroethane; 1,1,2-trifluoro-1,2,2-trichloroethane; dichlorofluoromethane; and trifluorobromoethane. In the gas from the hydrolysis reaction the principal organic constituent is monochlorodifluoromethane, with a small proportion of methylene chloride also present. In the treated water there were found 3 p.p.m. of chloroform and 5 p.p.m. of sym-tetrachloroethane, which are removable from it, if desired, by carbon absorption or other processing techniques. Also present in the gaseous medium above the untreated spent catalyst there are found silicon tetrachloride, monochlorodifluoromethane, phosgene and methylene chloride.

EXAMPLE 2

Instead of discharging to the sewer the neutralized filtrate from which antimony and arsenic had been removed, to 525 parts thereof containing regenerated calcium chloride there are slowly added 103.2 parts of the same spent catalyst over a period of nine minutes. Again, the temperature rises to 32° C. (from 26° C.) and stirring is continued for an additional ten minutes. This time, however the separated organic layer includes 36 parts of material. The neutralization of the aqueous layer consumes 56.5 parts of lime. The aqueous phase from the hydrolysis reaction is then processed in the same manner as in Example 1. This recycling reaction is repeated five times without any difficulties being encountered.

Alternatively, instead of the filtrate containing calcium chloride being that which was the result of hydrolysis, neutralization and subsequent sulfide-iron treatments, it may be similarly recycled as the source of calcium chloride for the hydrolysis by being returned to the hydrolysis vessel after phase separation, neutralization and filtration, without sulfide and iron treatments, in which case the same good results are obtainable. Also, such operations may be repeated over and over again.

EXAMPLE 3

To 525 parts of filtrate from the alternative method of Example 2 are added 103.2 parts of the same spent catalyst, over a period of five minutes, with ten minutes additional stirring after completion of the addition of the catalyst to the calcium chloride solution. 46 Parts of organic layer are separated without filtration to remove fluorides and other solids, and 54.3 parts of lime are used for neutralization. Gases developed from the hydrolysis reaction and during the neutralization are passed through a scrubber containing a 25% sodium hydroxide solution in water and it is noted that the scrubber operates successfully. The neutralized aqueous filtrate may subsequently be treated in the same manner as that described in Example 1.

EXAMPLE 4

To 280 parts of the calcium chloride solution filtrate from Example 3 were added 235 parts of city water and to the mixture there were charged 103.2 parts of the same spent catalyst of the previous example over a period of five minutes. The aqueous phase thereof, after separation out of 40 parts of organic layer, was neutralized with 53.7 parts of calcium hydroxide, with the temperature rise during such neutralization being 80° C. After completion of lime addition the neutralized hot solution was continuously purged with a stream of air to remove all traces of organic compounds. The neutralized filtrate is then subjected to the sulfide-iron treatments previously described in Example 1 and the filtrate after such reactions, and after monitoring to ensure that it contains less than 0.01 or 0.1 p.p.m., as the case may be, of each of antimony and arsenic, is sent to a plant outlet for treated waste, with the solid materials being pressed, dried, drummed and sent to an approved secure landfill for disposal. Alternatively, the solids are regenerated to $SbCl_5$ and $AsCl_5$ and are reused as fluorination catalysts. Also, the filtrate can continually be recycled and the organic materials can be sent back to the fluorination process or the organics can be used as specialty solents.

EXAMPLE 5

Following a continuous reaction process essentially like that illustrated in FIG. 3, to a quantity of 800 parts or ordinary city tap water there are added with agitation 200 parts of commercial calcium chloride dihydrate. The solution made and 205 parts of spent catalyst of the type described in Example 1 are continuously both added to an in-line mixer, with the catalyst being introduced from an inlet at about a right angle to the flowing calcium chloride solution. Alternatively, the mixing of the calcium chloride solution and the spent catalyst may be effected in the hydrolyzing reactor or mixer. If mixing is effected in-line the mixture is delivered to the hydrolysis vessel, which is connected to (or equipped with) a phase separator having take-off means thereon for removing upper and lower layers, as desired. The reaction vessel is also communicated to scrubbers (containing 25% aqueous sodium hydroxide solution), activated carbon absorbers and optionally, intermediate or otherwise suitably located cold traps, through which any gases must pass before exiting to the atmosphere. Upper aqueous liquid material which has separated out from the lower organic liquid is removed for neutralization with calcium hydroxide or an aqueous suspension of calcium hydroxide, as was effected in the batch processes of previous examples, and the neutralized material is continuously recycled to the feed line for the hydrolysis vessel. The lower organic layer from the hydrolysis vessel is continuously removed for recovery. The neutralization reaction uses 209.3 parts of lime and the pH after neutralization is about 5.5. The solids are separated (by filtration) as in previous examples and are recovered or dumped, as desired.

The filtrate from the continuous reaction is bled off as desired, when a portion thereof is to be sent to the sewer, and is treated with about 1 part of commercial lime per 500 parts of filtrate to adjust the pH to within the range of 5.5 to 6. To such material is added a 10% solution of sodium sulfide until the sulfide ion is present in slight excess, which normally occurs with about 1 to 1.2 parts of sodium sulfide being added. The addition of sodium sulfide is accompanied by an increase in the pH to about 10.2. Next, 3.5 parts of a 25% aqueous solution of ferric chloride are added, with the pH being lowered to about 7. The solids are filtered out and the filtrate, essentially free of arsenic and antimony (less than 0.1 p.p.m. of each) is monitored and sent to the plant outlet for treated waste for sewering.

Ideally, the reactions reported in this example are effected with equipment assembled in accordance with the diagrammatic illustration of FIG. 3 but variations thereof may also be utilized.

EXAMPLE 6

Hydrolysis: An aqueous calcium chloride solution is prepared by dissolving 100 grams of $CaCl_2.2H_2O$ in one liter of city water in a three liter reactor equipped with a variable speed agitator, a stop-clock controlled bottom drain, a 250 ml. addition funnel and a thermometer. A gas outlet is provided near the vessel top, connected to a caustic scrubber containing a 5% aqueous solution of sodium hydroxide. The funnel has a delivery tube extending from it to slightly below the surface of the calcium chloride solution. Through the funnel there are added 10 ml. of commercial grade ferric chloride solution (22%) as a reaction catalyst.

Two hundred milliliters (404 g.) of spent catalyst from fluorination processes for manufacturing chlorofluorinated hydrocarbons (which catalyst is of the type used in the previous examples) are introduced subsurface to the calcium chloride brine while the brine is being gently agitated to cause efficient dispersion of the organic components without emulsification. The addition is completed in 37 minutes. The temperature rises to 43° C. from 38° C. Cream colored solids precipitate out and reacted organic solvent settles to the bottom of the reactor flask. No fumes or off-gassing are observed during reactions with the calcium chloride solution (except for displaced air). The reaction mixture is stirred an additional ten minutes to ensure complete hydrolysis, after which agitation is discontinued and the mixture is allowed to settle and cool to ambient temperature. During the agitation clean separation of the organic and brine layers is maintained at all times.

Separation of Organics: The heavy organic layer at the bottom of the reactor, with an accompanying relatively small rag layer, is separated by action of gravity, and 140 ml. of the organic layer are drawn off. To ensure that all the organics have been drawn off a small portion (10 ml.) of aqueous layer is also withdrawn with the organic layer.

Organic Layer Clean-up: The aqueous/organic layer withdrawn is passed through a 250 ml. separatory funnel charged with one hundred grams of No. 4 (U.S. Sieve Series) anhydrous particulate calcium chloride. On a first pass through the $CaCl_2$ solution 90% recovery to clear dark brown neutral low viscosity organics is obtained. The organics were contacted by a freshly cleaned carbon steel nail and a piece of aluminum foil for a period of six days and no corrosion is noted on either metal item. This indicates that all the acidic components of the spent catalytic waste had been removed by the calcium chloride particles treatment. A total of three passes was made through the column of particles before it was spent. The yield of neutral organics was quantitative.

Neutralization: The reactor in which hydrolysis was effected is also used as a neutralization vessel but for the neutralization it is also equipped with a water-cooled condenser and an ice-cooled receiver. A caustic scrubber and a carbon column containing 100 g. of granular activated carbon are in the exit path of gas from the reactor.

In a separate vessel a lime slurry is prepared by adding 240 g. of hydrated lime to 500 ml. of city water. The lime slurry is slowly added to the aqueous reaction mixture to avoid objectionable foaming. The temperature rises to 80° C. A considerable amount of off-gassing is noticed during the neutralization. No odor is detected in the gas that passes through the scrubber and the activated carbon. White solids precipitate out, the pH increases to 12, and the volume of the reactants increases to 1,800 ml. Immediately after the lime neutralization the mixture was aerated for a half hour, after which time an aliquot is removed for an odor test. The odor of the aliquot is judged to be only slight. A small amount of condensate (5 ml.) is collected in the ice-cooled receiver. The condensate is of netural pH and has an arsenic content of 0.01 p.p.m. and an antimony content of 0.5 p.p.m.

Filtration: Solids from the reaction mixture are vacuum filtered out on an 11 cm. Fisher No. 9-801C filter paper, fitted in a Büchner funnel. The yield of the filtrate is 1,210 ml. (1,394 g.) and the filtrate is a clear light yellow, low viscosity liquid having a faint odor, a pH of 12 and a specific gravity of 1.152. One liter of the filtrate is retained for recycling to the next batch. A 100 ml. portion is retained for filtrate treatment. Solids collected weigh 647 g. and are of a specific gravity of 1.36.

Final Filtrate Treatment for Discharge: A 100 ml. sample of the filtrate, with the pH thereof at about 12 and with the concentrations of arsenic and antimony both below 10 p.p.m., is pH adjusted to about 6.5 to 7.5 by the addition of ferric chloride of aluminum sulfate, $Al_2(SO_4)_3$, solution to remove trace amounts of arsenic and antimony. The light brown precipitate which forms is collected on a filter. The filtrate, which is water white, is of an arsenic level less than 0.01 p.p.m. and of an antimony level of 0.01 p.p.m.

Recycle of Filtrate: A 1,000 ml. portion of the filtrate is recycled to the next batch. No more calcium chloride is added. No problems are encountered. The filtrate is recycled four times. On the fourth recycle the organic separation is judged to be better than for the previous three times. the diagrammatic illustration of FIG. 2 but variations thereof may also be utilized.

As seen from preceding examples the present invention provides efficient processes for practicable detoxification of spent fluorination catalysts containing toxic antimony and arsenic salts, usually with other toxic materials, too. It is capable of being utilized in batch and continuous operations and provides an improved method for effecting such detoxification.

The invention has been described with respect to examples and illustrations thereof but is not to be limited to these because it is evident that one of skill in the art, with the present specification before him, will be able to utilize substitutes and equivalents without departing from the invention.

What is claimed is:

1. A method for detoxifying spent antimony halide catalyst which comprises hydrolyzing in the presence of aqueous calcium chloride a non-aqueous spent antimony halide catalyst from a process for fluorinating halogenated hydrocarbons, which catalyst is acidic in water and is capable of producing fluoride ions upon hydrolysis, to produce an insoluble antimony compound and calcium fluoride and separating the insoluble antimony compound and the calcium fluoride from the aqueous liquid medium resulting from such hydrolysis.

2. A method according to claim 1 wherein the spent antimony halide catalyst comprises a halide of arsenic and a halogenated hydrocarbon, and volatile gases resulting from the hydrolysis reaction are scrubbed to remove toxic materials therefrom.

3. A method according to claim 2 wherein the spent catalyst comprises $SbCl_5$, $SbCl_4F$, $SbCl_3$, $AsCl_3$, HF, partially chlorinated methane, partially chlorinated ethane, and chlorofluorocarbons of 1 to 5 carbon atoms, scrubbing is effected with an aqueous solution of sodium hydroxide, after which the volatile gases are passed through an adsorbent of activated carbon before being discharged to the atmosphere, after hydrolysis an organic liquid phase is separated from an aqueous liquid phase, and the aqueous liquid phase is filtered to separate insoluble compounds of antimony and arsenic from the liquid phase.

4. A method according to claim 1 wherein the spent antimony halide catalyst comprises chlorides of antimony and arsenic, and after hydrolysis the aqueous liquid medium, containing insoluble antimony compound, is filtered to separate such insoluble antimony compound from the liquid phase thereof.

5. A method according to claim 4 wherein chlorides of antimony and arsenic are present in the spent antimony halide catalyst, antimony and arsenic are precipitated out as compounds thereof selected from the group consisting of calcium salts of acids thereof, oxides, hydroxides and oxyhalides as a result of the hydrolysis of the spent catalyst in the presence of aqueous calcium chloride, the compounds of antimony and arsenic selected from the group consisting of calcium salts of acids thereof, oxides, hydroxides and oxyhalides are separated from the aqueous liquid medium by filtration and the medium is neutralized with lime before or after such filtration.

6. A method according to claim 5 wherein the spent antimony halide catalyst comprises hydrogen fluoride and the neutralization of the filtrate with lime precipitates out calcium fluoride, which is filtered out from the liquid.

7. A method according to claim 5 wherein at least part of the aqueous medium after neutralization thereof by lime is at least part of the calcium chloride feed for hydrolyzing spent antimony halide catalyst.

8. A method according to claim 5 wherein the neutralized filtrate is treated with sulfide and a water soluble iron salt to co-precipitate antimony and arsenic therefrom, after which the solids are filtered from the liquid, the antimony and arsenic contents of the filtrate are monitored and the filtrate is conveyed to a plant outlet for treated waste when the antimony and arsenic contents thereof are each below 0.1 part per million.

9. A method according to claim 8 wherein the filtrate pH is adjusted to be within the range of about 4 to 8 for treatment with sulfide and iron salt by adding the lime thereto, the sulfide is sodium sulfide or sodium hydrosulfide and is in an aqueous solution, the water soluble iron salt is ferric chloride and is in an aqueous solution, and the final pH of the lime-, sulfide- and iron-treatd filtrate is within the range of about 4 to 7.

10. A method according to claim 1 wherein the proportion of calcium chloride charged to the hydrolysis reaction, on an anhydrous basis, with respect to the spent catalyst is within the range of about 20 to 100% by weight.

11. A method according to claim 10 wherein such proportion is within the range of 60 to 90%.

12. A method according to claim 1 wherein the spent catalyst comprises from about 30 to 90% of halides of antimony and arsenic, with the ratio of total antimony halides to arsenic halide being within the range of about 3:1 to 30:1 and the proportion of calcium chloride charged to the hydrolysis reaction, on an anhydrous basis, with respect to the total of antimony and arsenic halides in the spent catalyst is within the range of about 35 to 350%.

13. A method according to claim 12 wherein such proportion is within the range of 80 to 200%.

14. A method according to claim 3 wherein antimony and arsenic are precipitated out as compounds thereof selected from the group consisting of calcium salts of acids thereof, oxides, hydroxides and oxyhalides, and mixtures thereof, as a result of the hydrolysis of the spent catalyst in the presence of aqueous calcium chloride, the compounds of antimony and arsenic selected from the group consisting of calcium salts of acids thereof, oxides, hydroxides and oxyhalides are separated from the aqueous liquid medium by filtration and the medium in neutralized with lime before or after such filtration.

15. A method according to claim 14 wherein at least part of the aqueous medium after neutralization thereof by lime is at least part of the calcium chloride feed for hydrolyzing the spent antimony halide catalyst.

16. A method according to claim 15 wherein the spent antimony halide catalyst comprises hydrogen fluoride and the neutralization of the filtrate with lime precipitates out calcium fluoride, the neutralized filtrate is treated with sulfide and a water soluble iron salt to co-precipitate antimony and arsenic therefrom, after which the solids are filtered from the liquid, the antimony and arsenic contents of the filtrate are monitored and the filtrate is conveyed to a plant outlet for treated waste when the antimony and arsenic contents thereof are each below 0.1 part per million.

17. A method according to claim 16 wherein the spent catalyst comprises from about 30 to 90% of halides of antimony and arsenic, with the ratio of total antimony halide(s) to arsenic halide being within the range of about 3:1 to 20:1, and the proportion of calcium chloride charged to the hydrolysis reaction, on an anhydrous basis, with respect to the total of antimony and arsenic halides in the spent catalyst, is within the range of about 80 to 200%.

18. A method according to claim 12 wherein the process is conducted continuously.

19. A process for hydrolyzing to an insoluble antimony compound an antimony halide which is in a non-aqueous medium containing hydrogen fluoride, by treating the antimony halide, in non-aqueous medium containing hydrogen fluoride, with an aqueous solution of calcium chloride.

20. A method according to claim 19 wherein the antimony halide is a mixture of $SbCl_5$ and $SbCl_3$ and is in the presence of lesser proportions of $AsCl_3$ and HF, chlorinated lower hydrocarbons and chlorofluorinated lower hydrocarbons.

21. A method according to claim 19 wherein the treatment is conducted in the presence of a transition element ion and/or calcium ion to improve the reaction.

22. A method according to claim 20 wherein the treatment is conducted in the presence of iron ions to promote the reaction and facilitate separation of aqueous and organic phases resulting.

23. A method according to claim 19 wherein after the hydrolysis treatment the aqueous layer is neutralized with lime and filtered.

24. A method according to claim 20 wherein the treatment is conducted in the presence of a transition element ion and/or calcium ion and facilitates separation of the aqueous and organic phases resulting, the organic layer is removed from the aqueous layer and the aqueous layer is neutralized with lime and filtered to remove antimony and arsenic values therefrom.

25. A method according to claim 19 wherein the hydrolysis produces separate organic and aqueous phases, the phases are separated, with a proportion of the aqueous phase being removed with the organic phase, and the organic phase, with the proportion of aqueous phase present with it, is treated with particulate calcium chloride to remove the aqueous phase from the organic phase.

26. A method according to claim 20 wherein the treatment is conducted in the presence of a transition element ion and/or calcium ion and promotes the hydrolysis reaction and improves the separation of the aqueous and organic phases resulting, the organic phase is separated from most of the aqueous phase except for a small proportion of such aqueous phase, and such small proportion of the aqueous phase is removed from the organic phase by treating it with particulate calcium chloride.

27. A method according to claim 4 wherein the filtrate, after neutralization with lime, is pH adjusted to be in the range of about 11 to 12 by the addition of a suitable base to precipitate out arsenic and antimony compounds, which are removed from the filtrate, after which the pH is adjusted to within the range of pH's of about 4 to 8 by addition of a suitable iron or aluminum salt, such as ferric chloride or aluminum sulfate, and the filtrate resulting is essentially free of arsenic and antimony values.

* * * * *